US009574731B2

(12) United States Patent
Giraud et al.

(10) Patent No.: US 9,574,731 B2
(45) Date of Patent: Feb. 21, 2017

(54) LIGHT GUIDE FOR AN AUTOMOBILE LIGHTING AND/OR SIGNALING DEVICE

(71) Applicant: Valeo Vision, Bobigny (FR)

(72) Inventors: Sylvain Giraud, La Fleche (FR); Yves Gromfeld, Angers (FR)

(73) Assignee: Valeo Vision, Bobigny (FR)

( * ) Notice: Subject to any disclaimer, the term of this patent is extended or adjusted under 35 U.S.C. 154(b) by 52 days.

(21) Appl. No.: 13/946,254

(22) Filed: Jul. 19, 2013

(65) Prior Publication Data
US 2014/0029284 A1    Jan. 30, 2014

(30) Foreign Application Priority Data
Jul. 23, 2012   (FR) ..................... 12 57136

(51) Int. Cl.
*F21V 9/00*    (2015.01)
*F21S 8/10*    (2006.01)
*F21V 8/00*    (2006.01)

(52) U.S. Cl.
CPC ............. *F21S 48/00* (2013.01); *F21S 48/215* (2013.01); *F21S 48/2243* (2013.01); *F21S 48/2262* (2013.01); *F21S 48/2281* (2013.01); *G02B 6/002* (2013.01); *G02B 6/0018* (2013.01); *G02B 6/0033* (2013.01)

(58) Field of Classification Search
CPC ...... F21S 48/00; F21S 48/215; F21S 48/2243; F21S 48/2262; F21S 48/2281; G02B 6/0033; G02B 6/0018; G02B 6/002

USPC .......................................... 362/511
See application file for complete search history.

(56) References Cited

U.S. PATENT DOCUMENTS

| | | | |
|---|---|---|---|
| 5,700,078 A | 12/1997 | Fohl et al. | |
| 6,755,556 B2 * | 6/2004 | Gasquet | F21S 48/2212 362/328 |
| 6,824,284 B2 | 11/2004 | Chinniah et al. | |
| 6,953,271 B2 * | 10/2005 | Aynie et al. | 362/511 |
| 8,061,880 B2 | 11/2011 | Lambert et al. | |
| 8,506,129 B2 | 8/2013 | Okada | |
| 2003/0235046 A1 * | 12/2003 | Chinniah et al. | 362/31 |
| 2006/0239020 A1 * | 10/2006 | Albou | 362/520 |
| 2010/0046242 A1 * | 2/2010 | Lambert et al. | 362/509 |
| 2010/0195346 A1 * | 8/2010 | De Lamberterie | 362/516 |
| 2012/0188774 A1 * | 7/2012 | Okada | 362/299 |

FOREIGN PATENT DOCUMENTS

| | | |
|---|---|---|
| EP | 2157363 | 2/2010 |
| EP | 2354637 | 8/2011 |
| EP | 2479486 | 7/2012 |

* cited by examiner

*Primary Examiner* — Ali Alavi
(74) *Attorney, Agent, or Firm* — Jacox, Meckstroth & Jenkins (57) ABSTRACT

The light guide for an automobile lighting device having at least one coupler having at least two input faces arranged so that, when a light source is positioned at a predetermined point in relation to the coupler, for each of the input faces, all the rays from the source passing geometrically through the point and penetrating into the guide through the input face are refracted there in mutually parallel planes.

22 Claims, 6 Drawing Sheets

LIGHT GUIDE FOR AN AUTOMOBILE LIGHTING AND/OR SIGNALING DEVICE

CROSS-REFERENCE TO RELATED APPLICATIONS

This application claims priority to French Application No, 1257136 filed Jul. 23, 2012, which is incorporated herein by reference and made a part hereof.

BACKGROUND OF THE INVENTION

1. Field of the Invention

The invention relates to the lighting and/or signaling devices for automobiles.

2. Description of the Related Art

It is known practice to provide such devices with a light guide in the form of a ply and LEDs whose light rays are routed by the guide to the output of the device. A light beam is thus produced that has a rectilinear or curved linear profile.

Now, in particular when the profile is curved, the beam may appear non-uniform, even discontinuous, along the line.

What is needed, therefore, is a lighting and/or signaling device that facilitates overcoming these problems.

SUMMARY OF THE INVENTION

One aim of the invention is to provide a beam in which the distribution of the light is continuous and uniform along the profile of the beam, regardless of whether this profile is rectilinear or curved.

To this end, according to the invention, a light guide is provided for an automobile lighting and/or signaling device, which comprises at least one coupler having at least two input faces arranged so that, when a light source is positioned at a predetermined point in relation to the coupler, for each of the input faces, all the rays from the source passing geometrically through the point and penetrating into the guide through the input face are refracted there in mutually parallel planes.

Thus, once the input faces have given this orientation to the rays penetrating into the guide, they can easily be oriented to produce, at the output of the guide, a uniform and continuous beam. It is then sufficient to implement such couplers in the guide, juxtaposed to obtain a beam in which the distribution of the light is continuous and uniform along the profile of the beam, regardless of whether this profile is rectilinear or curved.

Provision can be made for the coupler or at least one of the couplers to be arranged so that the parallel planes associated with one of the input faces are parallel to those associated with the other input face.

However, provision can also be made for the coupler or at least one of the couplers to be arranged so that the parallel planes associated with one of the input faces are inclined relative to those associated with the other input face.

This arrangement is particularly advantageous because it enables the couplers to follow the curvature of the guide as appropriate and produce a uniform and continuous beam, including in the curved areas of the ply.

Advantageously, the guide also comprises at least two reflection faces and is arranged so that the refracted rays are directed directly toward one of the reflection faces where they are reflected directly toward an output face of the guide.

Advantageously, each input face is arranged, in at least one of the parallel planes, so as to uniformly distribute on one of the reflection faces all the rays refracted in this plane. The shape of the input face can be chosen according to the dimensions of a light source so as to uniformly distribute on the reflection face the light emitted by this source when it is placed at the predetermined point. Advantageously, the input face has, in at least one of the parallel planes, a shape comprising an inflection point, for example S-shaped. As a variant, the input face may have, in at least one of the parallel planes, a shape without any inflection point such as a curve segment or a straight line segment.

In practice, although this input face has to provide the function of orientation of the abovementioned rays, there is a wide degree of freedom in configuring this face and notably obtaining the desired arrangement of the rays.

Preferably, each reflection face is cylindrical. Preferentially, the reflection face has a generatrix in the form of a straight line segment and a directrix in the form of a polynomial segment, notably parabolic. In this case, the directrix extends in a direction at right angles to the ply.

Such a reflection face makes it possible in practice to render all the rays reflected by this face mutually parallel, which makes it possible to obtain, at the output of the guide, a particularly uniform beam.

Preferably, all the reflection faces extend to one and the same distance from an output face of the guide.

The uniformity and the continuity of the beam produced by the guide are thus further enhanced.

Provision can be made for the coupler or at least one of the couplers to form a collimator.

Preferably, the coupler or at least one of the couplers has a lens arranged so that, when the source is positioned at the predetermined point, rays from the source arrive directly on the lens which transmits them directly to an output face of the guide.

This lens makes it possible to receive a portion of the rays from the source which are not directed toward the input faces. The efficiency of the system is thus enhanced. Furthermore, the portion of the beam produced by the lens can be positioned to provide a continuous extension of the beam portions produced by the input faces, to thus ensure the continuity of the beam.

Preferably, the rays from the source that arrive directly on the lens are refracted therein to be all directed parallel to a main axis of the coupler, toward the output face of the guide.

Advantageously, the lens of the coupler is positioned between the two input faces.

Provision can be made for the lens to have a convex shape seen from the predetermined point.

As a variant, the lens could be convex to enhance the uniformity.

Preferably, the coupler or at least one of the couplers is arranged to produce, at an output face of the guide, a beam of rectangular form in a plane at right angles to a main direction of the beam.

In one embodiment, the coupler or at least one of the couplers is arranged to produce, at an output face of the guide, a beam oriented in a main direction normal to this face or to a plane tangential to this face.

In another embodiment, the coupler or at least one of the couplers is arranged to produce, at an output face of the guide, a beam oriented in a main direction inclined relative to a normal to this face or to a plane tangential to this face.

Provision can be made for there to be at least two couplers.

Each of the couplers thus forms a part of the total beam produced by the guide and as many couplers as are necessary can be provided.

Preferably, at least two of the couplers are identical to one another.

According to the invention, a lighting and/or signaling device for an automobile is also provided which comprises a light guide according to the invention and a source positioned at the predetermined point.

For example, the source and the guide are arranged so that a light intensity per unit of surface area of a beam produced by the coupler or at least one of the couplers exhibits, at any point at least along a median line from an output face of the guide, a value of between 80% and 120%, even between 90% and 110%, of an average value of this intensity along this line, this line being parallel to a main face of the guide or to a plane tangential to this face.

Such a particularly uniform beam can easily be obtained by suitably configuring the faces of the guide and the source.

Preferably, the source and the guide are arranged so that, at an output face of the guide, less than half of the surface of a section of the beam produced by the coupler, in a plane at right angles to a main direction of the beam, originates from the lens.

Thus, the portion of the beam produced by the lens remains a minority proportion compared to the rest of the beam. The lens therefore has only a complementary transmission role. In this way, the generation of a "hot spot" at the center of the beam, that is to say of a spot exhibiting a particularly high light intensity compared to the others, is avoided.

Preferably, the source is a light-emitting diode (LED).

Another object according to the invention is an automobile comprising a light and/or signaling part and/or device according to the present invention.

BRIEF DESCRIPTION OF THE ACCOMPANYING DRAWINGS

There now follows a description of a preferred embodiment of the invention and a variant by way of nonlimiting examples and in support of the appended drawings in which.

DETAILED DESCRIPTION OF THE PREFERRED EMBODIMENTS

FIGS. 1 to 11 illustrate an embodiment of a lighting and/or signaling device for automobiles according to the invention. It is understood that the invention is also applicable to lighting devices or even to lighting and signaling devices for such vehicles.

The device 2 comprises a light guide 4 and light sources 6 comprising, in this case, LEDs. The guide comprises couplers 8, of which, in this case, there are seven, this number not being limiting so that it can be less than or greater than this value. The number of LEDs is identical to the number of couplers with which they are associated bijectively.

Figure 1:
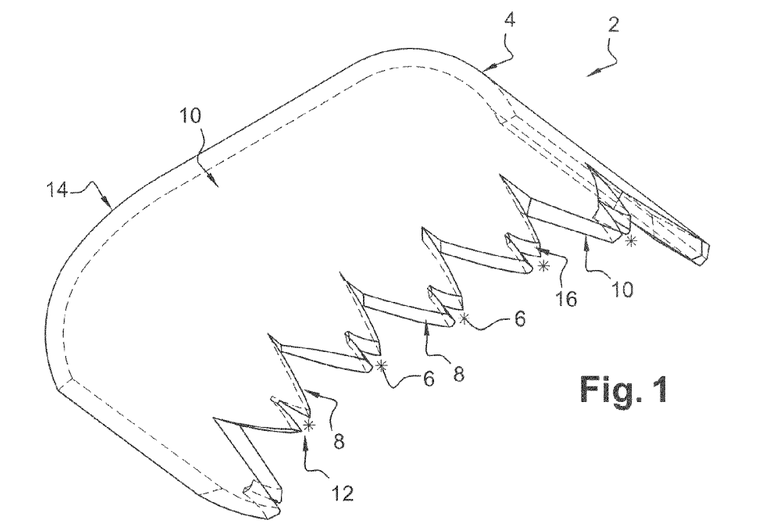
FIGS. 1 to 3 are perspective and front views of the light guide and of the light sources of a signaling device according to the invention.
Figure 2:
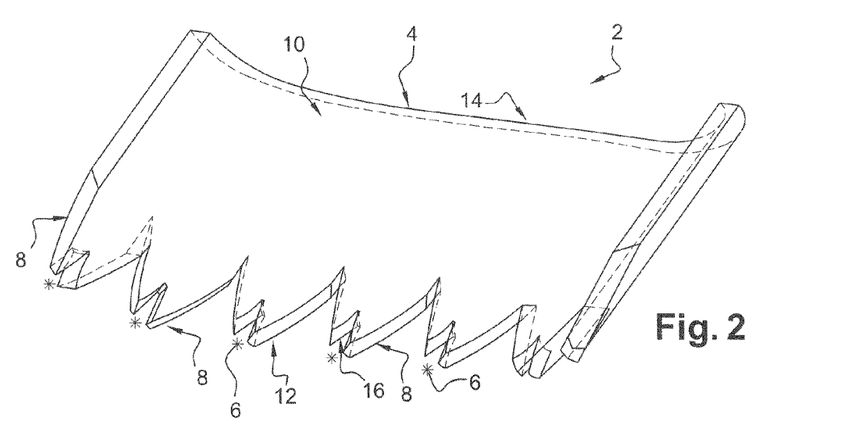
Figure 3:
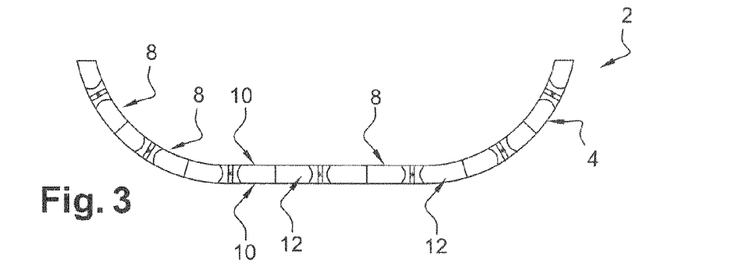
Figures 4, 5:
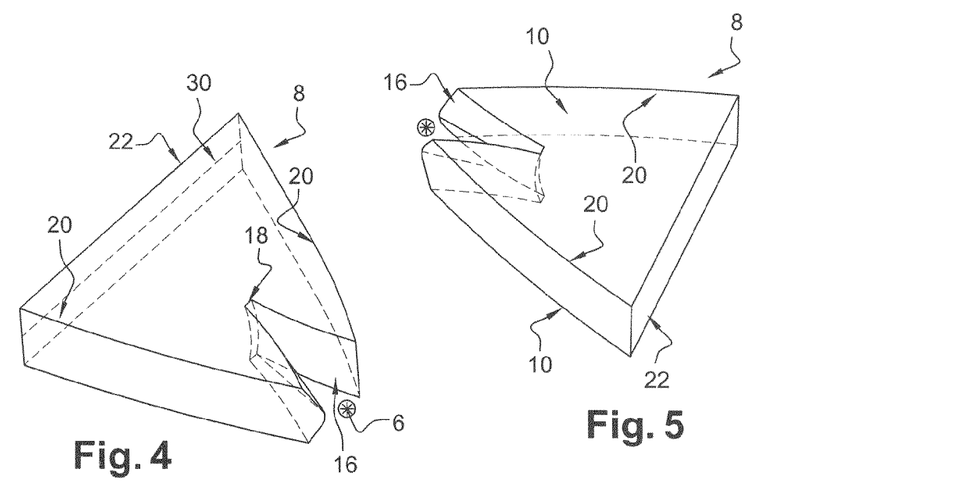
FIGS. 4 and 5 are perspective views of one of the couplers of the device of FIG. 1.

The guide 4 is in the general form of a cylindrical profiled ply and has two main faces 10, locally parallel to one another, so that the guide has a constant thickness. In the median part of the guide, the two faces 10 are planar. The two lateral end portions of the guide are curved back on the same side as the median part to give a generally "U"-shaped profile as illustrated in FIG. 3. The faces 10 are therefore respectively convex and concave.

In this case, it is a single-piece guide produced by molding a transparent plastic material. This is, for example, PMMA with a refractive index of 1.49 or polycarbonate with a refractive index of 1.59.

The guide exhibits two fields each extending over the end parts and the median part and respectively forming an input field 12 and an output field 14. The couplers 8 form the input field and follow one another along the latter from one end of the guide to the other.

A detailed description of the shape of one of the couplers extending in the median part will now be given.

The coupler 8 has two planar main faces 10 formed by the main faces of the guide. It also has two input faces 16, a lens 18 and two internal reflection faces 20. A face 22 has also been indicated in the drawings as extending from one end to the other of the reflection faces 20. However, this results from the artificial isolation of the coupler from the guide. Such a face does not in fact exist.

An orthogonal reference frame X, Y, Z is used here, in which the directions X and Y are parallel to the faces 10 and the planes XY and XZ form two planes of symmetry of the coupler.

The abovementioned faces here constitute the only faces of the coupler 8. The coupler 8 in this case is generally in the form of an isosceles triangle seen in plan view. It has a notch or mouth 24 (FIG. 6) initiating the point of the triangle opposite to the base 22 thereof. This notch is materialized by the two input faces 16 which extend facing one another but diverging as they approach the point. The lens 18 provides the join between the two inner ends of the input faces 16. And the latter, at their outer ends, share a common edge with the respective reflection faces 20.

The source 6 is positioned so that its geometrical center extends at a predetermined point 26 situated facing the two input faces 16 and the lens 18.

The input faces 16 and the reflection faces 20 are constructed so as to produce the following effects on the light rays emitted by the source positioned at the point 6.

Figure 6:
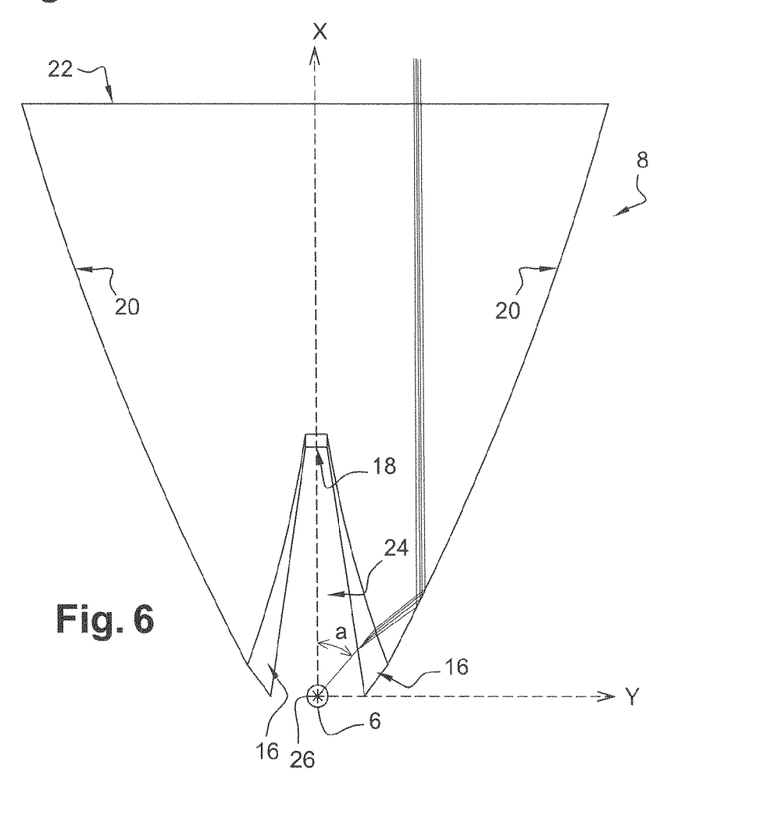
FIGS. 6 to 8 are plan views of the coupler of FIG. 4 showing the path of the light rays.
Figure 7:
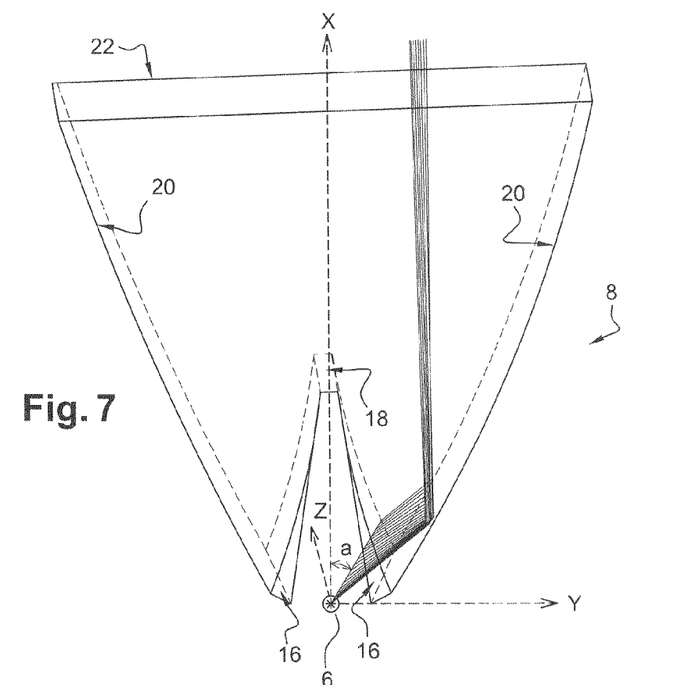

As illustrated in FIGS. 6 and 7, the light rays from the source which strike any one of the input faces 16 while having, in the plane XY, one and the same inclination a relative to the axis X, are considered first. These rays are refracted by this face to be directed directly toward the reflection face 20 situated facing the latter and in such a way that the latter reflects the rays in a direction parallel to the axis X.

Figure 9:
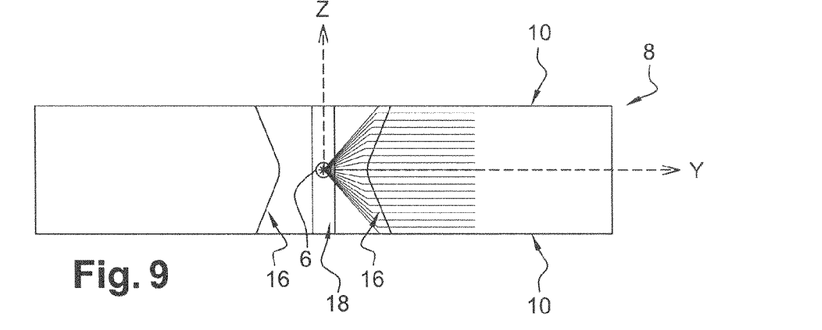
FIG. 9 is an elevation view of the coupler of FIG. 4 also showing the path of the light rays.

Furthermore, with reference to FIG. 9, and by observing the coupler in a plane parallel to the axes Y and Z, for each input face 16, the rays from the source which strike this face are refracted there inside the coupler in planes which are all parallel to the axes X and Y, that is to say to the main faces 10. In this case, these planes associated with the two faces 16 are parallel to one another. To this end, the faces 16 in the planes parallel to the directions Y and Z can be given the profile of a lens with a focus situated at the point 26 which therefore refracts a divergent radiation into a radiation with parallel rays.

Furthermore, with reference to FIG. 6, in the absence of any collimator, the light intensity of the source 6 varies in the plane XY as a function of the angle of emission a in relation to the direction X. In this case, the input and reflection faces are calculated so as to obtain, as far as possible, a uniform distribution of the light intensity in a direction parallel to the axis Y on the hypothetical output face 22 and on the output face 14 of the guide.

Figure 8:
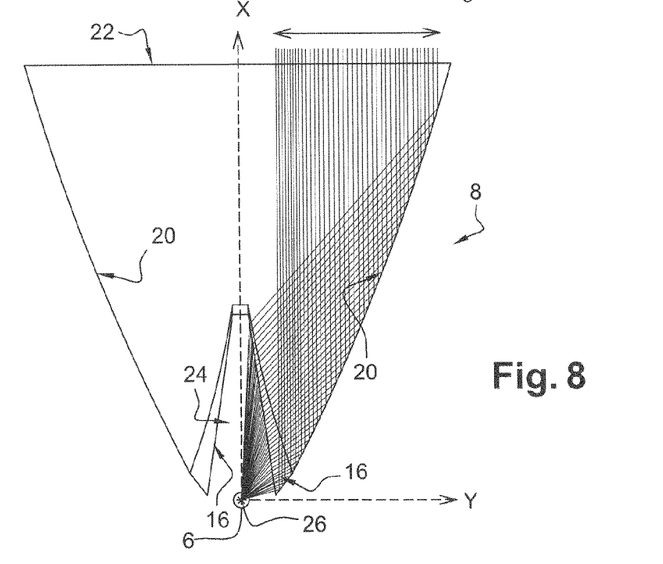

In this case, a median line 30 is defined which is parallel to the direction Y and extending over the face 22 or over the output face of the guide, equidistant from the two main faces 10. This ensures that a light intensity per unit of surface area of the beam produced by the coupler exhibits, at any point of this line at least, a value of between 90% and 110% of an average value of this intensity along this line. In this way, a particularly uniform distribution of the light intensity is obtained along this line, as illustrated in FIG. 8. Preferably, this property is also valid for all the lines of this face parallel to the line 30.

In this case, the reflection faces 20 are total reflection faces and have a cylindrical shape with parabolic or near parabolic profile in a plane parallel to the directions X and Y.

The lens 18 makes it possible to receive the radiation from the source directed toward the output face 22 and which is not received by the input faces. This is what has been illustrated in FIG. 14 in relation to the variant embodiment. The rays from the source 6 arriving directly on the lens are refracted therein to be all directed parallel to the axis X toward the output face of the guide. The portion of the beam produced by the lens therefore ensures the continuity with the two beam portions produced by the reflection faces 20. The focus of the lens is situated at the point 6. The source and the guide are arranged so that less than half of the surface area of a section of the beam produced by the coupler, in a plane at right angles to a main direction of the beam, originates from the lens.

Figure 10:
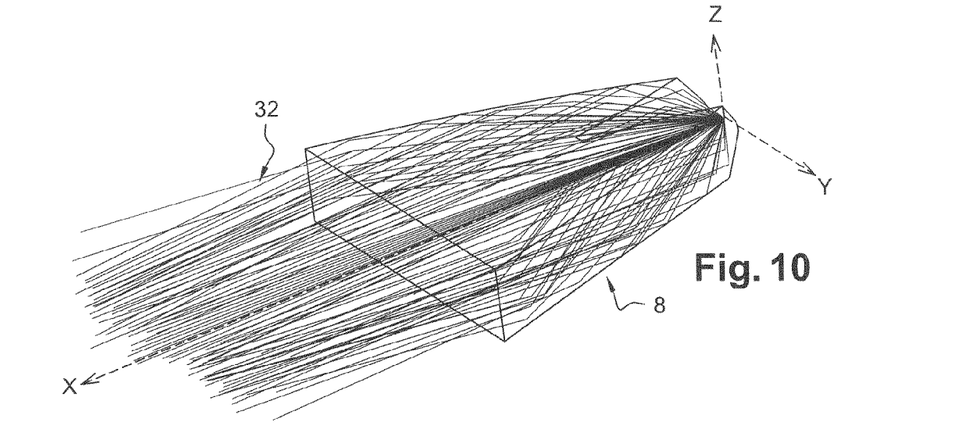
FIG. 10 is a perspective view of the coupler of FIG. 4 showing the beam produced by the coupler.

As illustrated in FIG. 10, the coupler 8 therefore forms a collimator which generates, at the output of the coupler 8, a collimated beam of rectangular section in a plane at right angles to the direction X which constitutes the direction of propagation of the beam. The distribution of the light intensity in the section is uniform in the two directions Y and Z. It will be observed here that, given the path of the light rays explained above, none of these rays normally strike one of the main faces 10.

Three couplers 8 of this type are thus implemented, extending side by side in the median part of the guide 4.

The four couplers 8 extending in the end parts of the guide 4 are formed slightly differently given the curve of the ply at these points. Each of these couplers 8 is differentiated from those illustrated in FIGS. 4 to 10 by the fact that the plane XY no longer forms a plane of symmetry. The two halves of the coupler 8 each formed by an input face 16, a half of the lens 18 and a reflection face 20, all situated on the same side of the axis X, are considered hereinbelow. In the couplers 8 of the end regions, these two halves are inclined relative to one another as if the preceding coupler had been modified by "rotating" these two halves about a hinge of axis X. By contrast, in the couplers 8 of the median part, these two halves are symmetrical to one another relative to the plane XZ. The definition and the properties of the input and reflection faces remain unchanged except that the parallel planes associated with one of the input faces are inclined in relation to those associated with the other input face. Furthermore, these faces are now limited by curved portions of the main faces which intercept them.

These curved couplers 8 therefore also produce beams which exhibit, in section in a plane parallel to the directions Y and Z, a uniform and continuous light intensity distribution, this section this time being curved.

In the present example, the input faces 16 are all identical with one another apart from their limitation by the main faces 10. The same applies for the reflection faces 20.

The thickness of the light guide 4 is equal to the thickness of each of the couplers 8. Furthermore, the couplers 8 are positioned so that the points 6 all extend to the same distance from the output face 14. The same applies for the distance extending between this face and each reflection face 20. In this case, the couplers 8 are oriented in the direction of extrusion of the guide.

Figure 11:
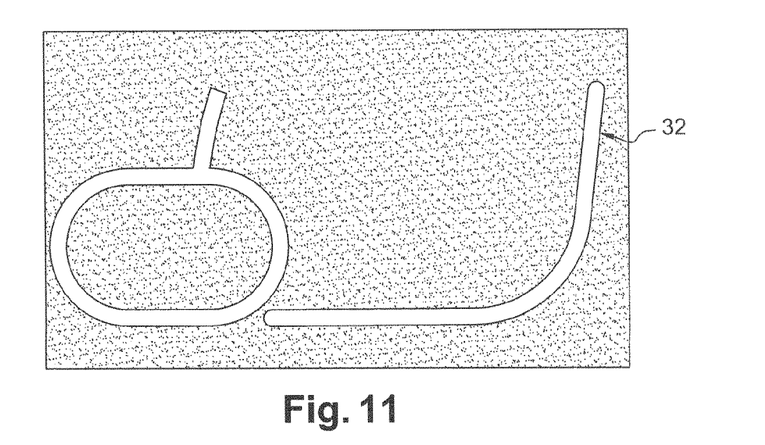
FIG. 11 is a photograph from the front of the beam produced by the guide of FIG. 1.

A signaling device comprising a plurality of couplers of this type makes it possible to produce a beam 32 like that illustrated in FIG. 11 which exhibits a good continuity and a good uniformity all along the lines of which it is formed, in particular in the curved portions.

Figure 12:
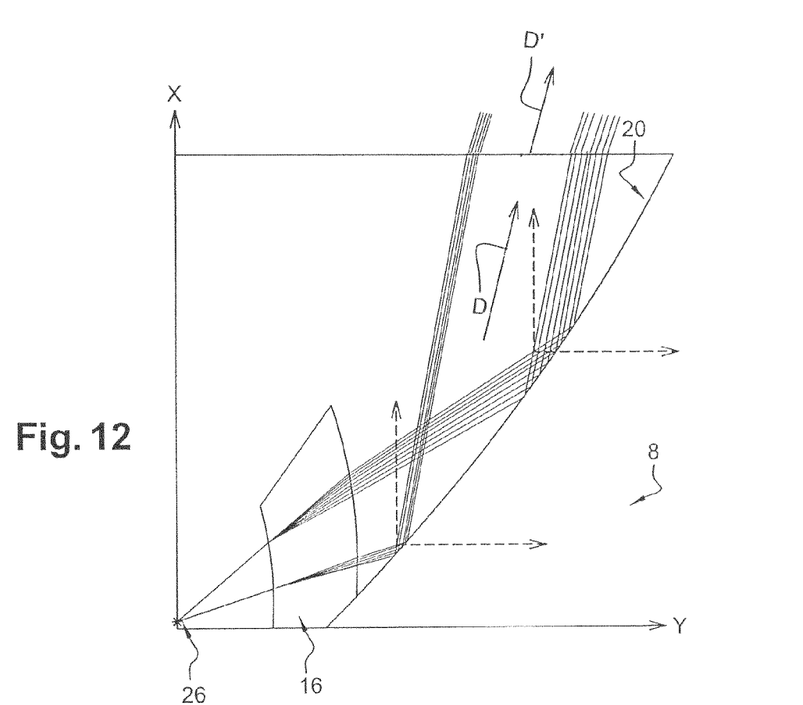
FIGS. 12 to 14 are views similar to FIGS. 7 and 8 showing a variant embodiment of the guide.
Figure 13:
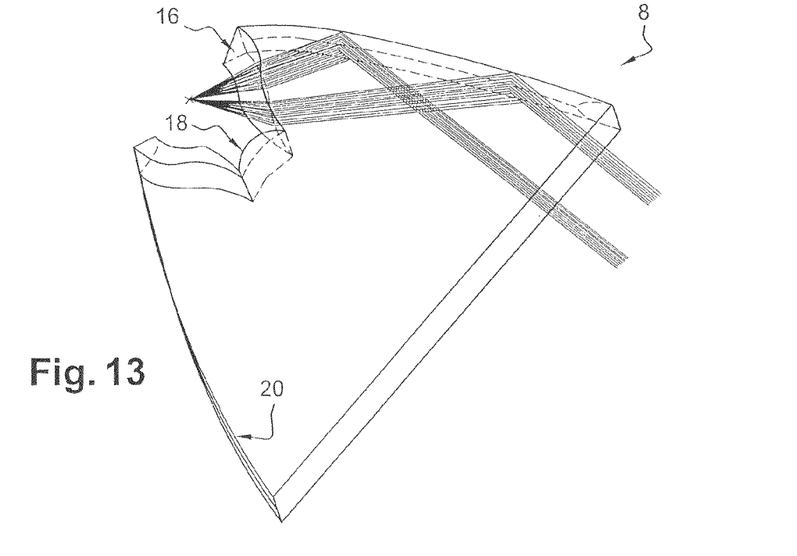
Figure 14:
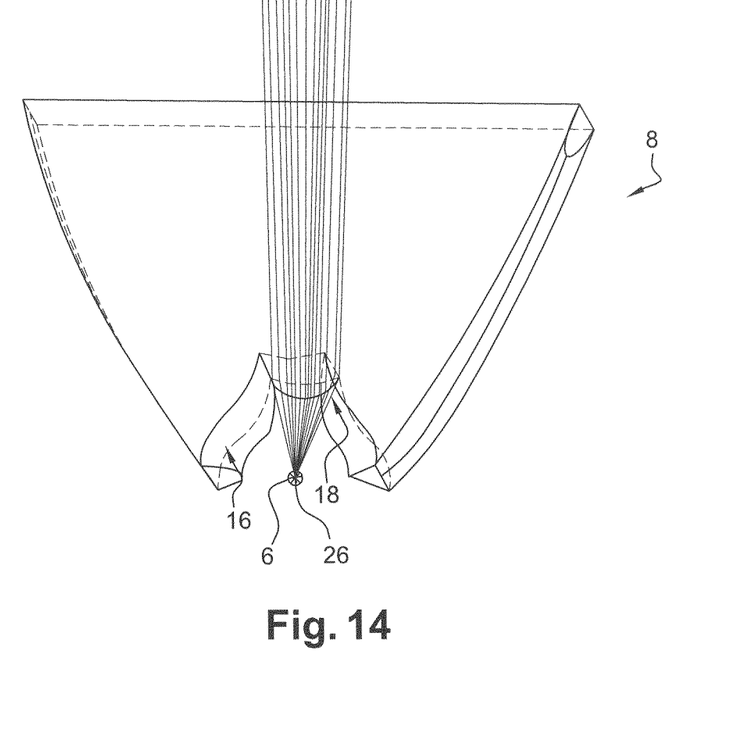

In the variant illustrated in FIGS. 12 to 14, the input and reflection faces are modified so that the rays reflected by the latter are oriented in one and the same main direction D before crossing the output face, then in one and the same main direction D' at the output of this face. These two directions D and D' are inclined relative to the axis X and inscribed in a plane parallel to the directions X and Y. Since the direction D is inclined relative to the axis X, the direction D' is all the more so, given the refraction which occurs at the output face transition. This variant makes it possible in particular to compensate for any inclination of the main axis of the light source relative to the axis X. The input face here is "S"-shaped in a plane parallel to the directions X and Y to further increase the uniformity of the light intensity. Here, it has a profiled shape with hyperbola profile.

The guide will, for example, be able to have a length and/or a width of between 25 and 35 mm.

The invention is applicable to flat or curved light guides.

Obviously, numerous modifications will be able to be made to the invention without departing from the framework thereof.

Although the output face 14 here has a planar shape, it will be possible to give this face a curved shape in a plane or in two planes at right angles to one another. It is therefore a plane tangential to this curved face and the direction normal to this plane that will then have to be considered to identify the orientation of the main direction of the beam from each coupler.

Each of the input faces and of the reflection faces can be defined portion by portion, without these faces having a simple overall shape or geometrical definition, to give the beam produced by the coupler the desired properties.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A light guide for an automobile lighting device, wherein said light guide comprises:
    at least one coupler having at least two input faces that are generally opposed and joined by a lens so that when a light source is positioned at a predetermined point in relation to said at least one coupler, for each of said at least two input faces, all the rays from said light source passing geometrically through said predetermined point and penetrating into said light guide through at least one of said at least two input faces are refracted once and in mutually and substantially parallel planes toward an output face, said at least two input faces diverging as said at least two input faces extend away from said lens and toward said light source;

said light guide also comprises at least two reflection faces, said light guide being arranged so that the refracted rays are directed directly toward one of said at least two reflection faces where said refracted rays are reflected to provide reflected rays that are reflected directly toward said output face of said light guide;

wherein all of said rays that penetrate through either of said at least two input faces first encounter a single refraction and then a single reflection and light that passes through said lens is not reflected before said light exits said light guide;

wherein each of said at least one coupler of said light guide has at least two generally smooth, continuous and diverging input faces, and wherein each of said at least one coupler is connected to an adjacent coupler by a plurality of adjacent sidewalls connecting generally discontinuously at about a midpoint between said at least one coupler and said adjacent coupler, said at least one coupler and said adjacent coupler and said plurality of adjacent sidewalls connected to each other in a predetermined configuration to provide said light guide;

wherein said light guide defines a sheet having guiding faces that are generally parallel and that extend from said at least two input faces to said output face.

2. The light guide according to claim 1, in which said at least one coupler or at least one of the couplers is arranged so that the parallel planes associated with one of the input faces are parallel to the parallel planes associated with the other input face.

3. The light guide according to claim 2, in which the coupler or at least one of the couplers is arranged so that the parallel planes associated with one of the input faces are inclined relative to the parallel planes associated with the other input face.

4. The light guide according to claim 2, in which the coupler or at least one of the couplers is arranged to produce, at an output face of the guide, a beam of rectangular form in a plane at right angles to a main direction of the beam.

5. The light guide according to claim 2, in which there are at least two couplers.

6. The light guide according to claim 1, in which each reflection face is cylindrical.

7. The light guide according to claim 6, in which the reflection face has a generatrix in the form of a straight line segment and a directrix in the form of a polynomial segment, the directrix extending notably in a direction at right angles to a ply.

8. The light guide according to claim 7, in which said polynomial segment is parabolic.

9. The light guide according to claim 1, in which the coupler or at least one of the couplers is arranged so that the parallel planes associated with one of the input faces are inclined relative to the parallel planes associated with the other input face.

10. The light guide according to claim 1, in which the coupler or at least one of the couplers is arranged to produce, at an output face of the guide, a beam of rectangular form in a plane at right angles to a main direction of the beam.

11. The light guide according to claim 1, in which the coupler or at least one of the couplers is arranged to produce, at an output face of the guide, a beam oriented in a main direction normal to the output face or to a plane tangential to the output face.

12. The light guide according to claim 1, in which the coupler or at least one of the couplers is arranged to produce, at an output face of the guide, a beam oriented in a main direction inclined relative to a normal to the output face or to a plane tangential to the output face.

13. The light guide according to claim 1, in which there are at least two couplers.

14. The light guide according to claim 1, in which said lighting device is at least one of a headlamp or a signaling module.

15. The light guide according to claim 1, in which each input face is arranged, in at least one of the parallel planes, so as to uniformly distribute on one of at least two reflection faces all the rays refracted in the parallel plane.

16. The light guide according to claim 15, in which each reflection face is cylindrical.

17. The light guide according to claim 1, in which the coupler or at least one of the couplers has a lens arranged so that, when the source is positioned at the predetermined point, rays from the source arrive directly on the lens which transmits the rays directly to an output face of the guide.

18. The light guide according to claim 17, in which the lens of the coupler is positioned between the two input faces.

19. A lighting device for an automobile, wherein the lighting device comprises:

a light guide; and a source arranged at a predetermined point;

said light guide further comprising at least one coupler having at least two input faces that are generally opposed and joined by a lens so that when a light source is positioned at a predetermined point in relation to said at least one coupler, for each of said at least two input faces, all the rays from said light source passing geometrically through said predetermined point and penetrating into said light guide through at least one of said at least two input faces are refracted once and in mutually and substantially parallel planes toward an output face, said at least two input faces diverging as said at least two input faces extend away from said lens and toward said light source;

said light guide also comprises at least two reflection faces, said light guide being arranged so that the refracted rays are directed directly toward one of said at least two reflection faces where the refracted rays are reflected to provide reflected rays that are reflected directly toward said output face of said light guide;

wherein all of said rays that penetrate through either of said at least two input faces first encounter a single refraction and then a single reflection and light that passes through said lens is not reflected before said light exits said light guide;

wherein each of said at least one coupler of said light guide has at least two generally smooth, continuous and diverging input faces, and wherein each of said at least one coupler is connected to an adjacent coupler by a plurality of adjacent sidewalls connecting generally discontinuously at about a midpoint between said at least one coupler and said adjacent coupler, said at least one coupler and said adjacent coupler and said plurality of adjacent sidewalls connected to each other in a predetermined configuration to provide said light guide;

wherein said light guide defines a sheet having guiding faces that are generally parallel and that extend from said at least two input faces to said output face.

20. The lighting device according to claim 19, in which said source and said light guide are arranged so that, at an output face of said light guide, less than half of the surface of a section of the beam produced by said at least one coupler, in a plane at right angles to a main direction of the beam and situated immediately after the output face of said light guide, originates from the lens.

21. The lighting device according to claim 19, in which the source is a light-emitting diode (LED).

22. The lighting device according to claim 19, in which said lighting device is at least one of a headlamp or a signaling module.

\* \* \* \* \*